United States Patent
Basesme

(10) Patent No.: US 9,572,429 B2
(45) Date of Patent: Feb. 21, 2017

(54) HOUSEHOLD APPLIANCE HAVING IMPROVED HEIGHT PROFILE ADJUSTABLE FEET

(71) Applicant: ARCELIK ANONIM SIRKETI, Istanbul (TR)

(72) Inventor: Tugrul Basesme, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/888,937

(22) PCT Filed: May 3, 2013

(86) PCT No.: PCT/EP2013/059283
§ 371 (c)(1),
(2) Date: Nov. 3, 2015

(87) PCT Pub. No.: WO2014/177227
PCT Pub. Date: Nov. 6, 2014

(65) Prior Publication Data
US 2016/0081474 A1    Mar. 24, 2016

(51) Int. Cl.
*F16M 11/24* (2006.01)
*A47B 91/02* (2006.01)
(Continued)

(52) U.S. Cl.
CPC ............ *A47B 91/024* (2013.01); *A47B 91/02* (2013.01); *A47L 15/4253* (2013.01);
(Continued)

(58) Field of Classification Search
CPC ... A47B 91/024; A47B 91/02; A47L 15/4253; F16M 7/00; D06F 39/125; F25D 2323/0011; F25D 23/00
(Continued)

(56) References Cited

U.S. PATENT DOCUMENTS

| 106,317 | A | * | 8/1870 | Bull | ..................... A47B 91/024 |
| | | | | | 248/188.4 |
| 155,635 | A | * | 10/1874 | Brotherton | ........... A47B 91/024 |
| | | | | | 248/188.4 |

(Continued)

FOREIGN PATENT DOCUMENTS

| EP | 1103206 A1 | 5/2001 |
| WO | 2004107914 A1 | 12/2004 |

(Continued)

OTHER PUBLICATIONS

International Search Report or PCT/EP2013/059283 and the references cited therein.
(Continued)

*Primary Examiner* — Kimberly Wood
(74) *Attorney, Agent, or Firm* — Kilpatrick Townsend & Stockton LLP

(57) ABSTRACT

The present invention relates to a household appliance (1) having a pair of front feet (3) and rear feet (4), each couple of front feet (3) and rear feet (4) being mechanically couplable by an extension shaft (6) being secured within said household appliance (1), said rear feet (4) of said household appliance (1) being formed as individual foot mechanisms (2) having a coupling end (11) introducible into an installation slot (8), the latter being directly exposed to the outside on rear surface of said household appliance (1) whereby a mutually interengaging mechanical relationship is provided between said household appliance (1) and said foot mechanism (2) so that said rear feet (4) of said household appliance (1) are individually removable and externally height adjustable.

2 Claims, 5 Drawing Sheets

Figure 1:
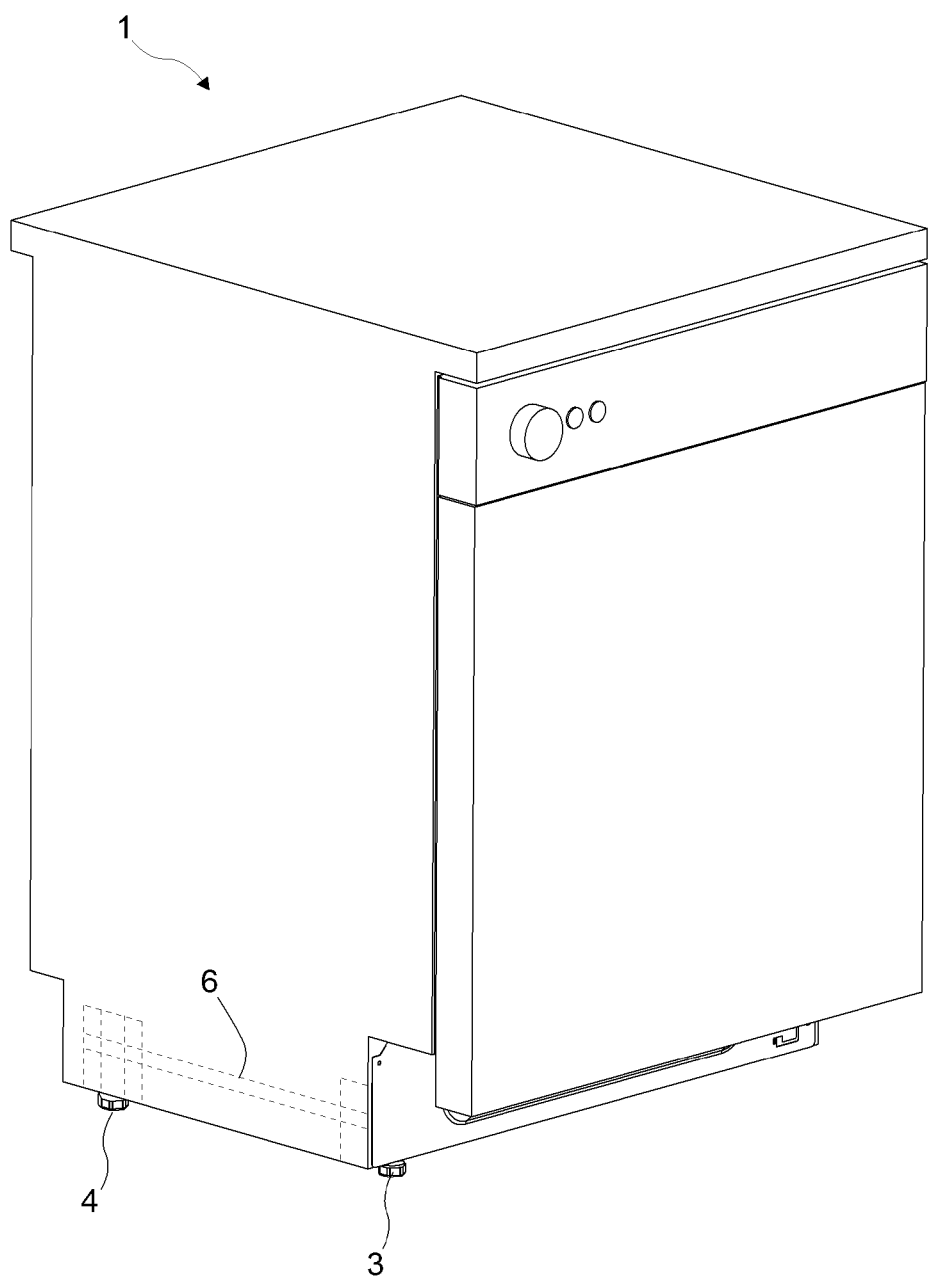

(51) Int. Cl.
*A47L 15/42* (2006.01)
*D06F 39/12* (2006.01)
*F16M 7/00* (2006.01)
*F25D 23/00* (2006.01)

(52) U.S. Cl.
CPC ............. *D06F 39/125* (2013.01); *F16M 7/00* (2013.01); *F25D 23/00* (2013.01); *F25D 2323/0011* (2013.01)

(58) Field of Classification Search
USPC ......... 248/188.2, 188.3, 188.4, 188.8, 188.9; 74/412 R
See application file for complete search history.

(56) References Cited

U.S. PATENT DOCUMENTS

| | | | | | |
|---|---|---|---|---|---|
| 341,481 | A | * | 5/1886 | Himes | A47B 91/024 248/188.4 |
| 809,078 | A | * | 1/1906 | Seymour | A47B 91/024 248/188.4 |
| 934,546 | A | * | 9/1909 | Kovacs | A47B 91/02 16/32 |
| 1,417,639 | A | * | 5/1922 | Sterner | A47B 91/028 248/188.4 |
| 1,632,383 | A | * | 6/1927 | Seiden | A47B 91/028 248/188.4 |
| 5,967,472 | A | * | 10/1999 | Wilhelmstatter | A47B 91/028 248/188.2 |
| 2003/0136887 | A1 | * | 7/2003 | Gabriel | A47L 15/4253 248/188.2 |
| 2005/0247834 | A1 | * | 11/2005 | Thuelig | A47L 15/4253 248/188.4 |
| 2008/0168855 | A1 | * | 7/2008 | Giefer | A47B 91/024 74/412 R |
| 2011/0297802 | A1 | * | 12/2011 | Gennaretti | D06F 9/125 248/188.4 |

FOREIGN PATENT DOCUMENTS

WO 2010020633 A1 2/2010
WO 2011080230 A1 7/2011

OTHER PUBLICATIONS

Written Opinion of the International Search Authority for PCT/EP2013/059283 and the references cited therein.

* cited by examiner

HOUSEHOLD APPLIANCE HAVING IMPROVED HEIGHT PROFILE ADJUSTABLE FEET

The present invention relates to a household appliance wherein the height is adjusted by leveling the feet supporting the body thereof.

In household appliances such as dishwashers, washing machines or refrigerators, the feet on which the body of the appliance is carried and supported may require height adjustment. The household appliance is typically balanced by leveling the feet. Particularly, built-in household appliances may require height adjustment after being placed in a cabin.

The height adjustment of the feet can be made by rotating the foot around its axis by means of a wrench. In most cases, adjustment of the height of the rear feet is enough for accurately leveling the appliance. In case of need for repair or maintenance of the appliance, or if adjusting the height of the appliance is required, for instance due to change of place, interfering with the housing by way of removing a plurality of bearings may become an unnecessarily long practice on the part of the maintenance staff.

Therefore a practically quick and effective manner of height adjustment is desirable for avoiding longer maintenance times. It is to be noted that a practically quick height arrangement allowing a relatively short duration of maintenance would involve no interference with the housing of the appliance so as to remove housing bearings and dismantle various components and/or parts. To this end, a household appliance readily and instantly connectible with a foot mechanism, the latter being height-adjustable in a removable manner such that its height is adjusted while removed, i.e. externally, substantially accelerates repair and maintenance processes.

Therefore, the present invention ensures that leveling of a household appliance can be performed quickly and with ease such that difficult situations arising when the appliance is at a very low position and working on the same with a wrench may become troublesome due to a narrow gap between the base of the body and the floor, are avoided.

A prior art publication in the technical field of the present invention may be referred to as WO2011080230 A1 among others, the document disclosing a household appliance comprising a height adjustment mechanism providing the height of the feet at the rear to be adjusted from a point at the front side of the body and having an adaptor shaft that provides the foot to move by being rotated.

The present invention provides an a household appliance comprising a height adjustment mechanism providing the height of the appliance's feet to be adjusted removably and in a readily reinstallable manner, which is defined by the characterizing features as defined in claim 1.

Primary object of the present invention is hence to provide a height adjustment mechanism providing the height of the appliance's feet to be adjusted removably and in a readily reinstallable manner.

The present invention proposes a household appliance conventionally having four feet at the front and rear sides, each couple of front and rear feet being mechanically couplable by an extension shaft. The rear feet can be removed and reinstalled by inserting a coupling end thereof into an installation slot. The installation slot is directly accessible since it is exposed to the outside on the rear surface the appliance.

The outermost end of the extension shaft projects outwardly in the direction of the coupling end and mates therewith within a region remaining inside the installation slot. An annular recess extends around said shaft wall and an outer protrusion of the coupling end fits inside said annular recess while a central protrusion thereof directly enters inside said extension shaft. Further, said cylindrical shaft wall fits into a peripheral groove of the coupling end.

Accompanying drawings are given solely for the purpose of exemplifying a household appliance comprising a height adjustment mechanism, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

FIG. 1 demonstrates a general perspective view of the household appliance according to the present invention.

Figure 2A:
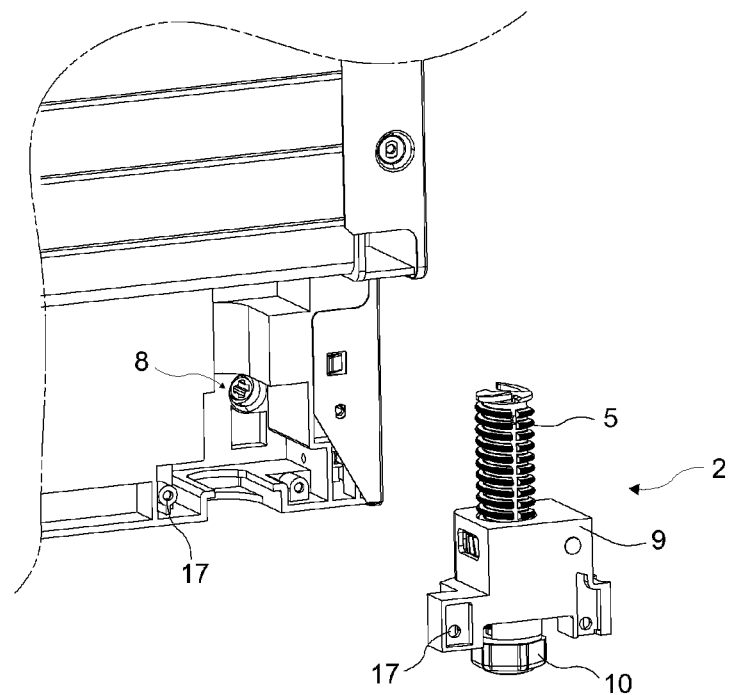
Figure 2B:
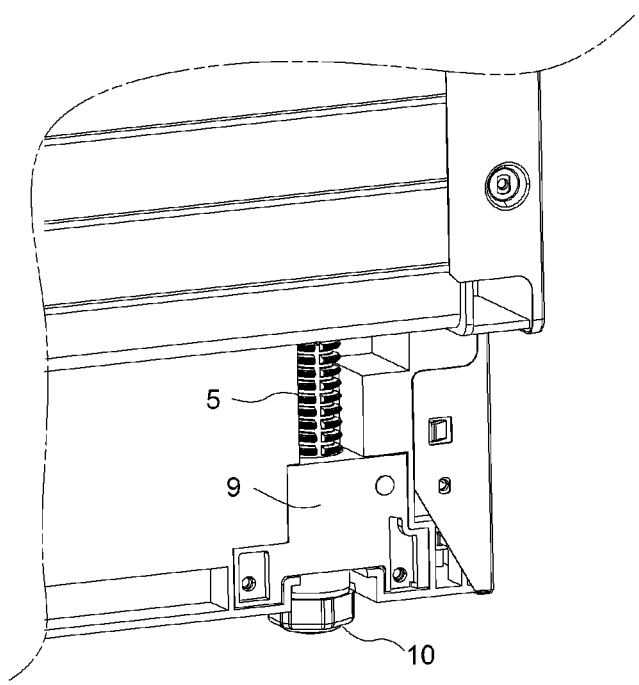

FIGS. 2a and 2b respectively demonstrate general perspective views of the rear portion before and after installation where a foot mechanism according to the present invention is installed in a household appliance.

Figure 3:
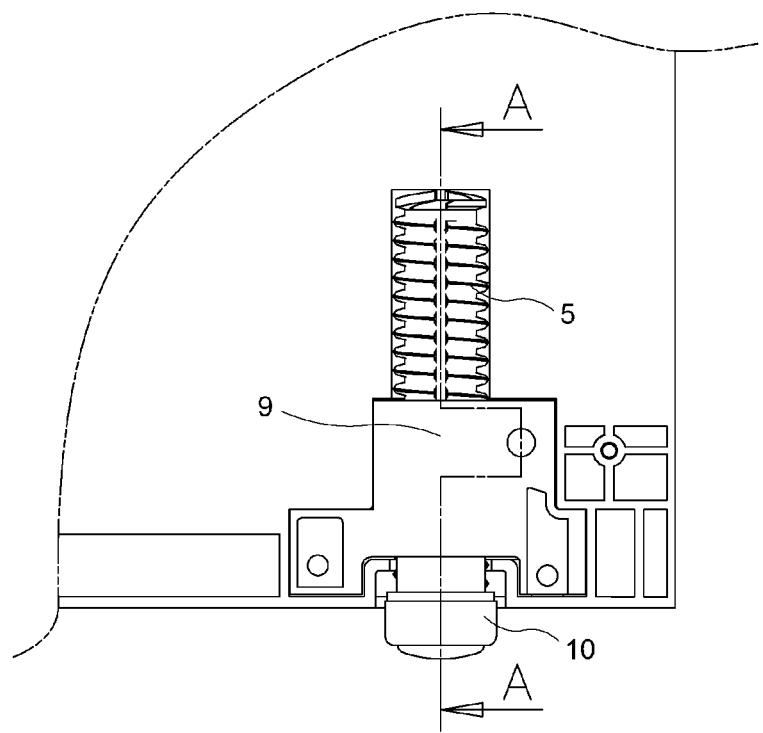

FIG. 3 demonstrates the rear view of a foot mechanism according to the present invention.

Figure 4:
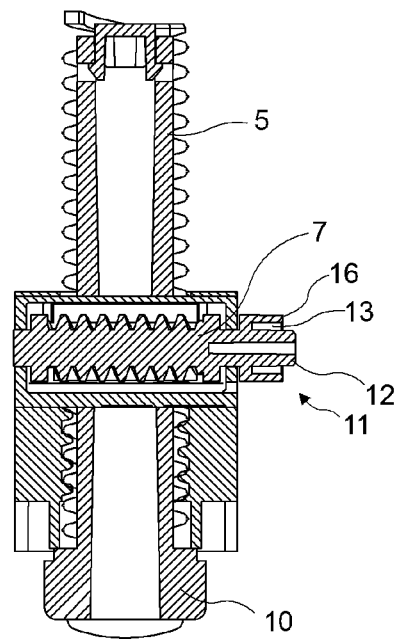

FIG. 4 demonstrates the A-A cross-section of the foot mechanism as indicated in FIG. 3.

Figure 5:
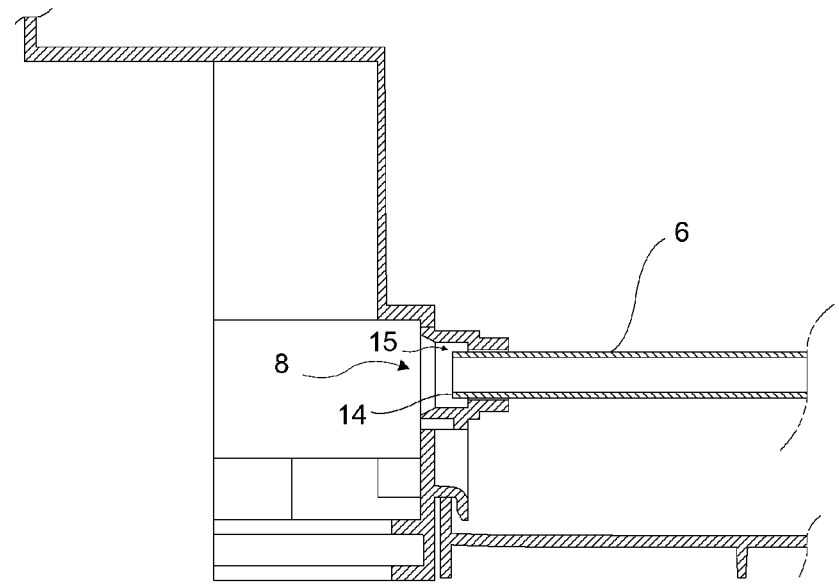

FIG. 5 demonstrates the A-A cross-section of the household appliance as indicated in FIG. 3.

Figure 6:
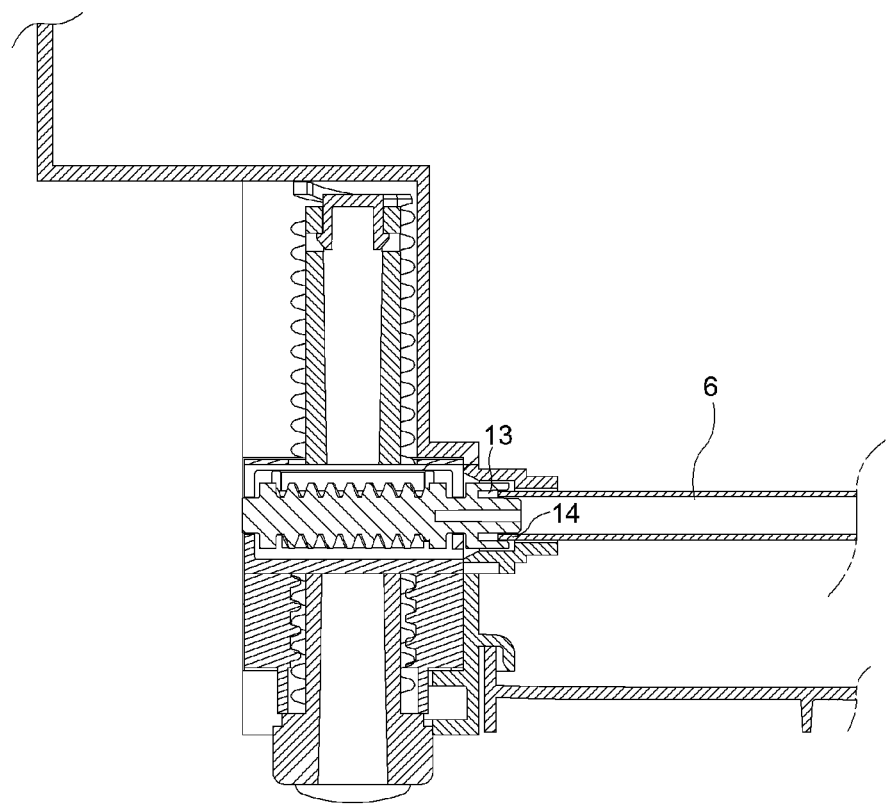

FIG. 6 demonstrates the A-A cross-section of the household appliance in which the foot mechanism is installed as indicated in FIG. 3.

Figure 7A:
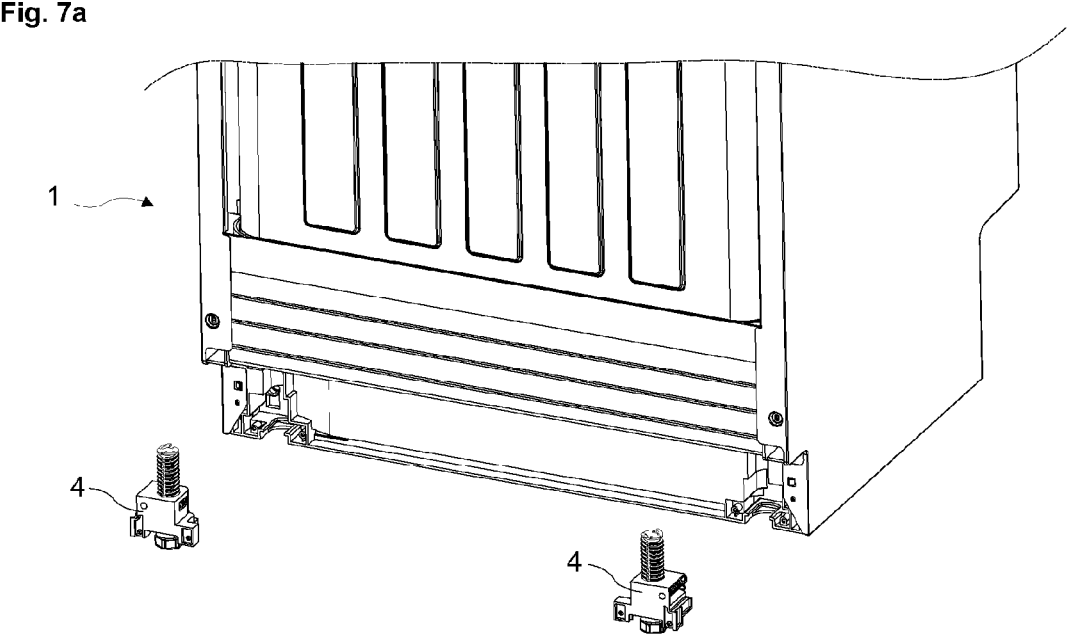
Figure 7B:
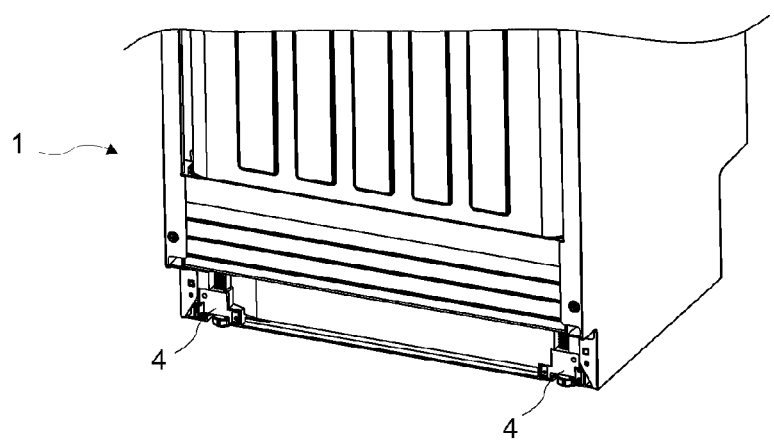

FIGS. 7a and 7b respectively demonstrate general rear perspective views of the household appliance according to the present invention before and after installation of the foot mechanisms.

The following numerals are used in this detailed description:
1. Household appliance
2. Foot mechanism
3. Front foot
4. Rear foot
5. Main shaft
6. Extension shaft
7. Ring gear
8. Installation slot
9. Foot housing
10. Housing base part
11. Coupling end
12. Central protrusion
13. Peripheral groove
14. Shaft wall
15. Annular recess
16. Outer protrusion
17. Fixing hole The present invention relates to a household appliance (1) such as a refrigerator, a washing machine, dishwasher, drying machine or a combo washer-dryer, which would well be a built-in household appliance (1) placed in a cabinet, providing the adjustment of height with a height adjusting mechanism as explained hereinafter.

The height adjusting mechanism of the invention is realized in the form a threaded main shaft (5) on which a ring gear (7) being displaceable along the main shaft (5) axis by means of a worm gear meshed with said ring gear (7). The worm gear is mechanically couplable with an extension shaft (6) extending into the inside of the household appliance (1) so as to be rotatably secured within the same. The height adjusting mechanism therefore conventionally provides height adjustment by means of the worm gear, rotation of which displaces said ring gear's (7) position up and down on said threaded main shaft (5) and in turn adjusts the distance between the floor and the plane said worm gear is meshed with said ring gear (7), that is the height of the appliance.

It is to be noted that height adjustment of a household appliance (1) can be satisfactorily performed by way of adjusting only the rear feet. To this end, the foot mechanisms (2) according to the invention are individually removable and externally height-adjustable parts readily installable to installation slots (8), the latter being directly exposed to the outside on the rear surface of the household appliance (1). The installation slots (8) being directly exposed to the outside ensure that the advantageous result can be achieved without removing any housing bearings or dismantle various components and/or parts of the household appliance (1).

The foot mechanism (2) comprises a foot housing (9) that accommodates said threaded main shaft (5) extending perpendicular to the floor plane and a housing base part (10), which carries and levels the household appliance (1) on the floor. The worm gear attachable to the extension shaft (6) and said ring gear (7) are also disposed within said foot housing (9).

According to the present invention, each rear foot mechanism (2) can individually be removed and reinstalled after its height being externally adjusted. This is achieved by way of introducing a coupling end (11) of the foot mechanism (2) into said installation slot (8), which is directly exposed to the outside. The installation slot (8) is formed such that the outer end of the extension shaft (6) protrudes outwardly as a cylindrical shaft wall (14) around which an annular recess (15) is provided. Said coupling end (11) cooperatively engages with said installation slot (8) such that while a central protrusion (12) of the coupling end (11) enters inside said extension shaft (6), an outer protrusion (16) thereof fits inside said annular recess (15). At the same time, the cylindrical shaft wall (14) fits into a peripheral groove (13) of the coupling end (11), therefore providing a mutually engaging mechanical relationship.

The final position of the foot mechanism (2) as mounted in the household appliance (1) can be conventionally locked in a any suitable manner, for example a spring-loaded cam (not shown) on the household appliance (1) can be used to lock the foot mechanism (2) in place. Said cam centers and aligns the foot mechanism (2) in the horizontal axis, i.e. in parallel with the floor, while mating of the coupling end (11) with said cylindrical shaft wall (14) provides positioning in the vertical axis. Finally, the foot mechanisms (2) can additionally be secured on the appliance (1) using bolts and nuts through the fixing holes (17).

The foot mechanism (2) of the invention being readily mountable without the necessity to lift the appliance (1) up before installation, is due to the fact that the foot mechanism (2) is connected with the appliance (1) through the installation slot (8), which is disposed on the rear surface of the appliance (1), i.e. in a directly accessible position. The installation slot (8) leads to the extension shaft (6), the latter being connected with one of the front feet (3). In each pair of front feet (3) and rear feet (4), the front feet (3) and rear feet (4) are mechanically connected by said extension shafts (6). To this end, in cases where more precise leveling is necessary and applying height adjustment to different combinations of front feet (3) and rear feet (4) is desired, front feet (3) height adjustment can be performed by removing the rear feet (4) first and rotating the extension shafts (6) by an appropriate hand tool as the extension shafts (6) are also coupled with respective front-side worm gears being meshed with front-side ring gears. Alternatively, height of the front feet (3) can be adjusted by front-side holes allowing access for rotation of said front-side ring gears.

In a nutshell, the present invention proposes a household appliance (1) having a pair of front feet (3) and rear feet (4), each couple of front feet (3) and rear feet (4) being mechanically couplable by an extension shaft (6) being secured within said household appliance (1). Said rear feet (4) of said household appliance (1) are formed as individual foot mechanisms (2) having a coupling end (11) introducible into the installation slot (8), the latter being directly exposed to the outside on the rear surface of said household appliance (1). The outermost end of the extension shaft (6) protrudes as a cylindrical shaft wall (14) within a region defined by the installation slot (8) with the annular recess (15) extending around said shaft wall (14). Said coupling end (11) cooperatively engages with the installation slot (8) such that while a central protrusion (12) of the coupling end (11) enters inside the extension shaft (6), an outer protrusion (16) thereof fits inside said annular recess (15) and the cylindrical shaft wall (14) fits into a peripheral groove (13) of the coupling end (11).

The foot mechanisms (2) of the invention serving to the purpose of rear-side supporting are individually removable and externally height-adjustable parts readily installable to the installation slots (8). The installation slots (8) being directly exposed to the outside on the rear surface of the household appliance (1), and hence readily accessible, ensures that removing any housing bearings or dismantling components and/or parts of the household appliance (1) is not required. Further, front feet (3) adjustment can also be performed by removing the rear feet (4).

The invention claimed is:

1. A household appliance (1) having a pair of front feet (3) and rear feet (4), each pair of front feet (3) and rear feet (4) being mechanically couplable by an extension shaft (6) being secured within the household appliance (1), said rear feet (4) of the household appliance (1) being formed as individual foot mechanisms (2) having a coupling end (11) introducible into an installation slot (8) of the household appliance, the installation slot being directly exposed on a rear surface of the household appliance (1), and wherein an outermost end of the extension shaft (6) protrudes as a cylindrical shaft wall (14) within a region defined by said installation slot (8) with an annular recess (15) extending around said shaft wall (14), said coupling end (11) cooperatively engages with the installation slot (8) such that while a central protrusion (12) of the coupling end (11) enters inside the extension shaft (6), an outer protrusion (16) thereof fits inside the annular recess (15) and, said cylindrical shaft wall (14) fits into a peripheral groove (13) of the coupling end (11), whereby a mutually engaging mechanical relationship is provided between the household appliance (1) and the foot mechanism (2) so that the rear feet (4) of the household appliance (1) are individually removable and externally height adjustable.

2. The household appliance (1) as in claim 1, said foot mechanism (2) further comprises a threaded main shaft (5) on which a ring gear (7) is displaceable.

* * * * *